United States Patent
Grahl et al.

(10) Patent No.: US 6,644,005 B1
(45) Date of Patent: Nov. 11, 2003

(54) COMBINATION OVERLOAD AND OVERFILL PROTECTION SYSTEM FOR A ROUND BALER

(75) Inventors: Scott V. Grahl, St. Cloud, WI (US); Kim P. Viesselmann, Grafton, WI (US)

(73) Assignee: Gehl Company, West Bend, WI (US)

( * ) Notice: Subject to any disclaimer, the term of this patent is extended or adjusted under 35 U.S.C. 154(b) by 0 days.

(21) Appl. No.: 09/927,961

(22) Filed: Aug. 10, 2001

(51) Int. Cl.$^7$ .............................................. A01D 39/00
(52) U.S. Cl. ........................................ 56/341; 100/88
(58) Field of Search ............................ 56/10.2 R, 10.3, 56/10.2 J, 10.8, 11.3, 341, 343, 344, 345, 350, 351, 358, 364, DIG. 15; 100/88, 89

(56) References Cited

U.S. PATENT DOCUMENTS

| | | | | |
|---|---|---|---|---|
| 3,938,652 A | * | 2/1976 | Sacht et al. | 100/189 |
| 4,403,544 A | * | 9/1983 | Naaktgeboren | 100/142 |
| 4,434,607 A | * | 3/1984 | Campbell | 100/88 |
| 4,567,718 A | * | 2/1986 | VanGinhoven | 100/88 |
| 5,090,307 A | * | 2/1992 | Lippens et al. | 100/142 |
| 5,131,214 A | * | 7/1992 | Vermeer | 100/88 |
| 5,327,820 A | * | 7/1994 | McClure et al. | 100/5 |
| 5,551,218 A | * | 9/1996 | Henderson et al. | 100/13 |
| 5,813,204 A | * | 9/1998 | Pecenka et al. | 100/88 |
| 6,012,271 A | * | 1/2000 | Wilkens et al. | 100/88 |

* cited by examiner

Primary Examiner—Thomas B. Will
Assistant Examiner—Nathan Mammen
(74) Attorney, Agent, or Firm—Boyle, Fredrickson, Newholm, Stein & Gratz, S.C.

(57) ABSTRACT

An overload and overfill protection system for a round baler includes a selectively engageable drive mechanism located between a rotary input member of the baler and an input driven member, such as a sprocket, which drives a pickup mechanism forming a part of the round baler. The selectively engageable drive mechanism includes a fixed drive member mounted to the rotary input member, and a shiftable engagement member mounted to the sprocket for movement between an engaged position for transferring power to the pickup mechanism, and a disengaged position in which power from the rotary input member is not transferred to the sprocket. The fixed drive member is in the form of a shear bolt, which is sheared by an overload force applied to the engagement member when the pickup mechanism is overloaded so as to disable the pickup mechanism. The overfill protection system is in the form of a clutching mechanism interconnected between a movable member of the baler, e.g. the baler takeup shuttle, and a trip member located adjacent the shiftable engagement member for moving the engagement member to a disengaged position when the takeup shuttle is in a position corresponding to a full bale condition for the baler. Movement of the shiftable member to the disengaged position prevents the transfer of power to the pickup drive system, to prevent additional crop material from being supplied to the baler.

26 Claims, 4 Drawing Sheets

COMBINATION OVERLOAD AND OVERFILL PROTECTION SYSTEM FOR A ROUND BALER

BACKGROUND AND SUMMARY OF THE INVENTION

This invention relates to round balers, and more particularly to a combination overload and overfill protection system for use in a round baler.

A round baler typically includes a series of side-by-side belts which define a bale-forming chamber. Crop material is supplied to the bale-forming chamber by a pickup mechanism, which picks crop material up off the ground and supplies the crop material rearwardly to a crop inlet associated with the baler. Due to the conditions within which the baler is typically operated, it is possible for the pickup mechanism to engage the ground with excess force or to encounter an object, such as a tree branch or the like, which applies an excessive force to the pickup mechanism. An overload condition such as this can cause serious damage to the drive system of the baler or to other components of the baler.

In addition, a round baler is typically designed to produce bales having a predetermined maximum bale diameter. Once the bale has attained the desired predetermined maximum bale diameter, the operator stops movement of the baler and commences a twine or net wrapping operation so as to finish the bale in preparation for discharge of the bale from the baler. If the operator is not observing the progress of bale growth, and if the baler does not have an overfill protection feature, it is possible for the operator to supply an excessive amount of crop material to the bale-forming chamber and to form a bale having a diameter exceeding the capacity of the baler.

It is an object of the present invention to provide a round baler with a selectively engageable pickup drive system which performs the dual function of overload and overfill protection for the baler, to prevent operation of the pickup mechanism in the event of either an overload or an overfill condition. It is a further object of the invention to provide such a system which reliably disengages the pickup drive system so as to ensure that operation of the pickup mechanism is stopped immediately when an overfill or overload condition occurs. It is a further object of the invention to provide such a system which can be employed without significant alterations in the basic design and operation of the components of the baler. Yet another object of the invention is to provide such a system which is capable of being used in combination with a chain and sprocket drive system for transferring power to the pickup mechanism. A still further object of the invention is to provide such a system which is relatively simple in its components and operation, yet which functions in an effective manner to selectively disable the pickup of the baler.

In accordance with the invention, a combination overload and overfill protection system for a round baler includes an input drive member which is normally rotated during operation of the baler. The input drive member may be in the form of a drive hub mounted to a support shaft which supports one of the rotatable rolls forming a part of the baler.

An input driven member, which may be in the form of an input sprocket, is rotatably mounted to the support shaft for movement independently of the input drive member. The input driven member may be in the form of a sprocket which is interconnected with a chain-type drive arrangement for transferring power to the pickup mechanism. A selectively engageable drive mechanism is interposed between the input drive member and the input driven member, and includes a shiftable engagement member mounted to one of the input drive member and the input driven member, and a fixed drive member engaged with the other of the input drive member and the input driven member. The shiftable engagement member is movable between an engaged position, in which the engagement member engages the fixed drive member, and a disengaged position in which the engagement member is moved out of engagement with the fixed drive member. During normal operation, the engagement member remains in engagement with the fixed drive member so as to rotate the input driven member in response to rotation of the rotatable input drive member.

An actuator mechanism includes a trip member and a latching member which is movable between a latching position and a release position. The baler includes a movable member which moves during bale growth within the bale-forming chamber. When the bale attains a predetermined maximum size within the bale-forming chamber, the movable member engages the latch member to move the latch member from its latching position to its release position. The actuator mechanism functions to move the trip member from an inoperative position to an operative position, in response to movement of the latch member to its release position. When the trip member is in its operative position, the trip member engages a lever interconnected with the engagement member of the selectively engageable drive arrangement, for moving the engagement member from its engaged position to its disengaged position. This functions to prevent the transfer of power from the rotatable input drive member to the input driven member, and to disable the pickup mechanism. Ejection of the bale from the bale-forming chamber functions to reset the actuator mechanism which returns the engagement member to its engaged position from its disengaged position, so as to allow subsequent bale formation and operation of the baler pickup drive system.

The fixed drive member is preferably in the form of a shear bolt with which the shiftable engagement member is engaged. In the event the pickup experiences an overload condition during operation, the overload force is applied to the head of the shear bolt through the shiftable engagement member. Application of an overload force above a predetermined threshold functions to shear the shear bolt, to immediately cut off power supplied to the pickup drive system and disable the pickup mechanism, to prevent further damage to either the drive system or other components of the baler. The operator then replaces the shear bolt in order to resume operation.

The invention further contemplates an improvement in a round baler and a method of operating a round baler, substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 6 is a partial section view taken along line 6—6 of FIG. 5a;

FIG. 10 is an enlarged partial section view taken along line 10—10 of FIG. 4a.

DETAILED DESCRIPTION OF THE INVENTION

Figure 1:
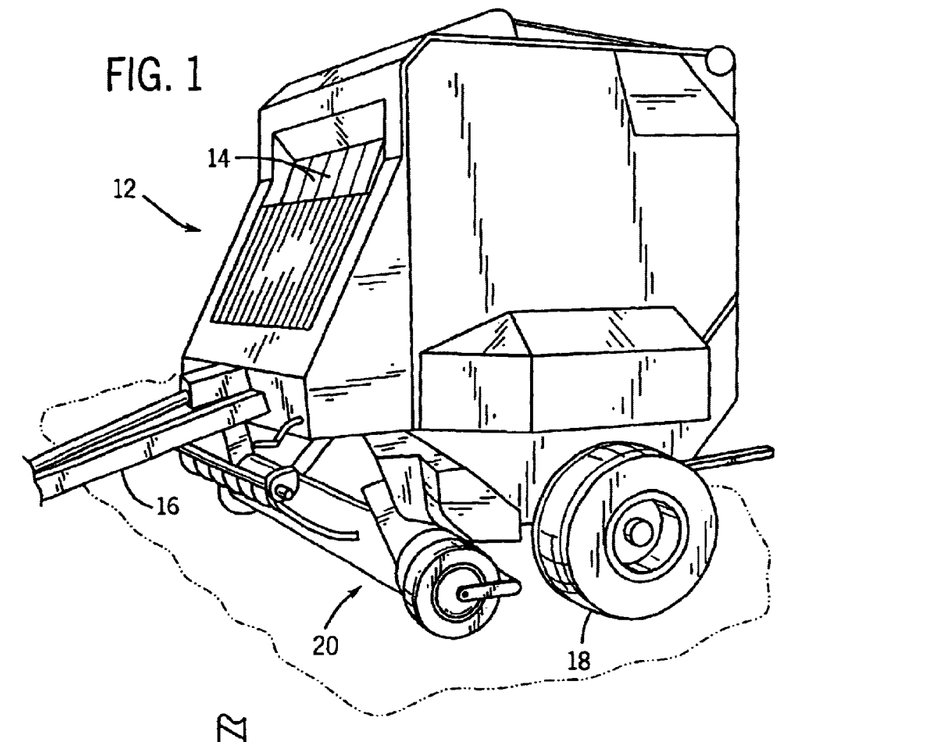
FIG. 1 is an isometric view of a round baler incorporating the overload and overfill protection system of the present invention.
Figure 2:
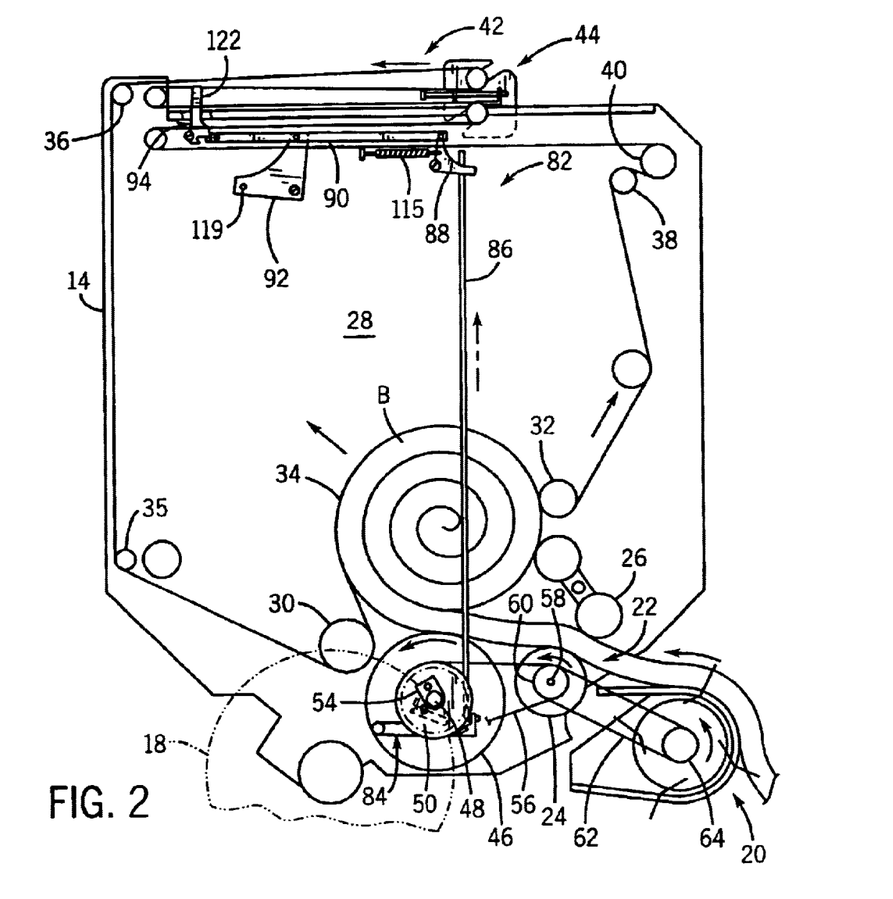
FIG. 2 is a schematic side elevation view of the internal components of the round baler of FIG. 1, showing the position of the components of the overload and overfill protection system of the present invention during formation of a bale within the bale-forming chamber.
Figure 3:
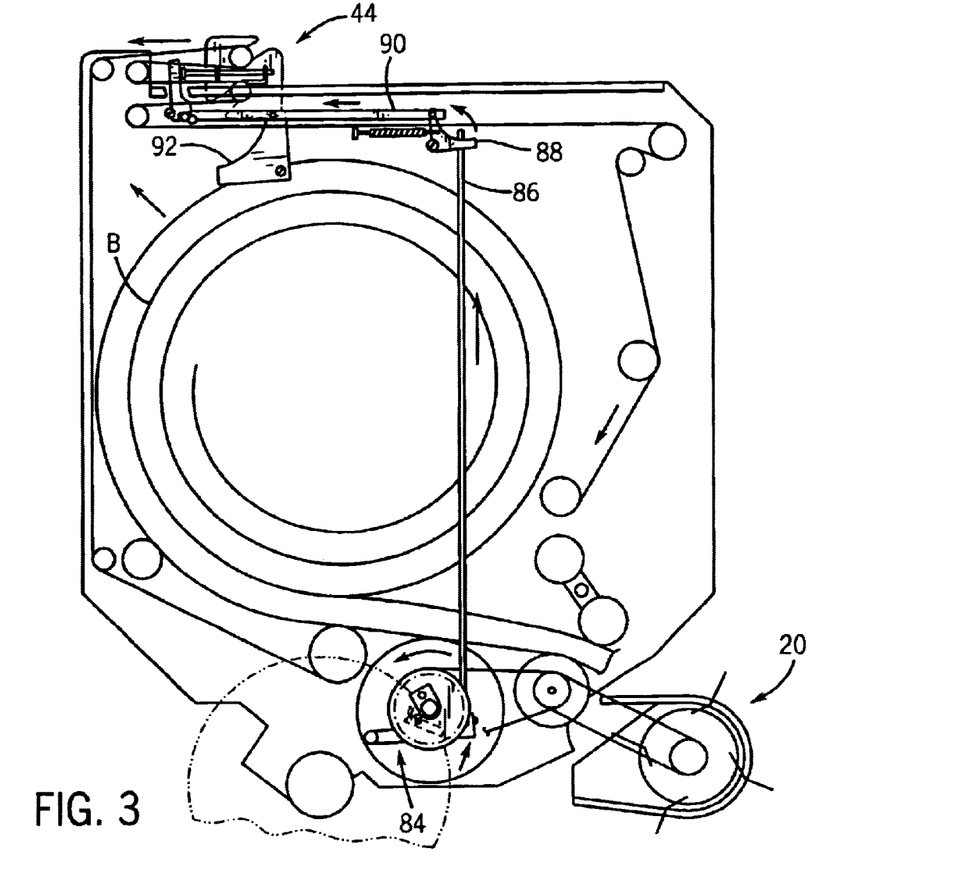
FIG. 3 is a view similar to FIG. 2, showing the position of the components of the overload and overfill protection system when the bale has attained a maximum predetermined diameter within the bale-forming chamber.

FIGS. 1–3 illustrate a round baler 12 incorporating a combination overload and overfill protection system in accordance with the present invention. In a manner as is known, round baler 12 includes a series of side-by-side baler belts 14 trained about a series of rollers, a tongue 16 for connection to a tow vehicle such as a tractor, and a pair of wheels 18 which enable baler 12 to move on the ground behind the tow vehicle. In a manner as is known, baler belts 14 define an internal bale-forming chamber to which crop material is supplied by a pickup mechanism 20, which is operable to lift crop material off the ground and to move the crop material upwardly and rearwardly toward a crop inlet, shown generally at 22. A lower infeed roller 24 and an upper infeed roller 26 are located at crop inlet 22, and receive crop material supplied to crop inlet 22. Infeed rollers 24, 26 rotate in opposite directions of rotation, and provide a variable open throat powered infeed system as shown and described in copending application Ser. No. 09/636,427 filed Aug. 10, 2000, the disclosure of which is hereby incorporated by reference.

As shown in FIGS. 2 and 3, baler 12 defines a bale-forming chamber 28 within which belts 14 are located. Belts 14 are trained about a series of rollers located within the interior of baler 12, including a lower tailgate roll 30 and an upper fixed roll 32 spaced above and forwardly of lower tailgate roll 30. A bale-forming run 34 of baler belts 14 extends between lower tailgate roll 30 and upper fixed roll 32, for receiving crop material fed rearwardly from crop inlet 22 by lower and upper infeed rolls 24, 26, respectively, and for forming the crop material into a round bale B. Belts 14 of baler 12 are further trained about a lower rear idler roll 35 and an upper rear idler roll 36, as well as a pair of upper front idler rolls 38, 40. Baler 12 further includes a take-up mechanism 42 with which belts 14 are engaged, and which includes a movable shuttle assembly 44 which moves rearwardly during growth of bale B within bale-forming chamber 28, in a manner as is known.

A floor roll 46 is located at the lower end of bale-forming chamber 28, and is operable to support bale B during formation. Floor roll 46 is rotatably driven through a conventional drive arrangement associated with baler 12, and rotates in a counterclockwise direction. Floor roll 46 is supported by a support shaft 48 which is rotatably supported by the frame of baler 12, in a manner as is known.

Figure 6:
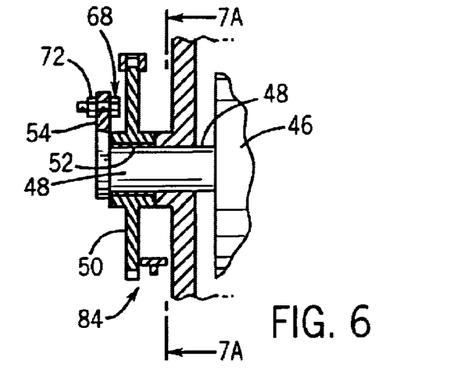

As shown in FIGS. 2 and 6, an input driven sprocket 50 is rotatably supported on support shaft 48 via a bushing 52, which enables input driven sprocket 50 to rotate relative to support shaft 48. An input drive member, in the form of a drive hub 54, is fixed to the end of support shaft 48 in any satisfactory manner, so as to be rotatable along with support shaft 48.

A flexible power transfer member, in the form of a chain 56, is engaged with input driven sprocket 50. Chain 56 extends forwardly from input driven sprocket 50, and is engaged with an inner driven sprocket (not shown) mounted to a support shaft 58 which is collinear with the support shaft of lower infeed roll 24. An outer sprocket 60 is mounted to support shaft 58 outwardly of the inner driven sprocket, and a pickup drive chain 62 extends between outer sprocket 60 and a pickup input sprocket 64. In this manner, pickup mechanism 20 is driven into rotation through outer sprocket 60, pickup drive chain 62 and pickup input sprocket 64 in response to rotation of lower infeed roll support shaft 58 caused by chain 56 and drive sprocket 58.

Referring to FIGS. 5–8, a selectively engageable drive arrangement is interposed between input driven sprocket 50 and drive hub 54, for selectively imparting rotation to input driven sprocket 50 in response to rotation of drive hub 54 through floor roll support shaft 48. The selectively engageable drive arrangement includes a fixed drive member in the form of a shear bolt 68 mounted to drive hub 54, and a shiftable engagement member 70 mounted to drive sprocket 50. Shear bolt 68 has a head located in the space between input driven sprocket 50 and drive hub 54, and a shank which extends through an opening in drive hub 54. A nut 72 is engaged with the shank of shear bolt 68 on the side of drive hub 54 opposite the head of shear bolt 68. Shear bolt 68 is of conventional shear bolt construction.

Figure 8:
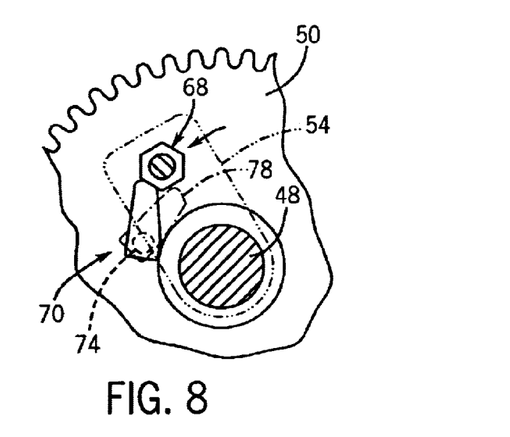
FIG. 8 is a partial elevation view illustrating the components of the selectively engageable drive arrangement interposed between the input drive member and the input driven member, which transfers power to the pickup drive system, in the overload and overfill protection system incorporated into the baler of FIG. 1.
Figure 9:
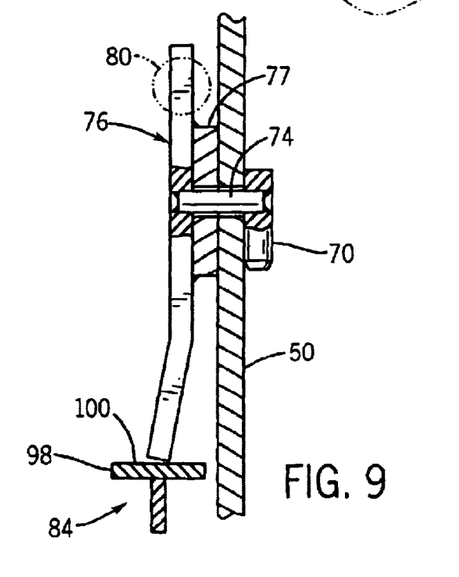
FIG. 9 is a partial section view taken along line 9—9 of FIG. 7b.

Referring to FIG. 8, shiftable engagement member 70, which is mounted to input driven sprocket 50, is movable between an engaged position as shown in solid lines and a disengaged position as shown in phantom. Engagement member 70 is pivotable about a pivot axis defined by a pivot pin 74 which extends through an opening formed in drive sprocket 50. Engagement member 70 is fixed to one end of pivot pin 74 outwardly of the outer side surface of input driven sprocket 50. Pivot pin 74 defines an opposite end which extends outwardly of the inner side surface of input driven sprocket 50, and a lever 76 including a bearing member 77 is secured to the inner end of pivot pin 74 opposite engagement member 70. In this manner, lever 76 and engagement member 70 are disposed on opposite sides of input driven sprocket 50. When engagement member 70 is in its engaged position as shown in solid lines in FIG. 8, an end engagement surface 78 of engagement member 70 engages the head of shear bolt 68, such that drive hub 54 is drivingly coupled to input driven sprocket 50 to impart rotation to input driven sprocket 50 in response to rotation of drive hub 54. In its disengaged position as shown in phantom lines in FIG. 8, engagement member 70 is pivoted inwardly about pivot pin 74 such that the entirety of engagement member 70 is positioned inwardly of the head of shear bolt 68, to prevent engagement between engagement member 70 and shear bolt 68. When engagement member 70 is in its disengaged position, drive hub 54 rotates freely without engagement with engagement member 70, so that there is no transfer of power to input driven sprocket 50 from drive hub 54. A spring 80 is engaged between drive sprocket 50 and one end of lever 76. Spring 80 functions to bias lever 76 such that engagement member 70 is biased toward its engaged position as shown in solid lines in FIG. 8.

Referring to FIG. 2, baler 12 includes an actuator mechanism, shown generally at 82, which is operable to selectively move engagement member 70 from its engaged position to is disengaged position, to selectively disable pickup mechanism 20. Actuator mechanism 82, in combination with shear bolt 68 and engagement member 70, make up a combination overload and overfill protection system for baler 10, for preventing the supply of additional crop material to crop inlet 22 in response to an overfill condition, and for stopping operation of pickup 20 in response to an overload condition.

Actuator mechanism 82 generally includes a pivotable trip member 84 mounted adjacent input driven sprocket 50, a vertical actuator rod 86 connected at its lower end to trip member 84 and connected at its upper end to a bell crank 88, and a horizontal actuator rod 90 pivotably mounted at its forward end to bell crank 88 and supported rearwardly of bell crank 88 by a reset crank 92. The rearward end of horizontal actuator rod 90 is located adjacent a pivotable latch member 94.

Figure 5A:
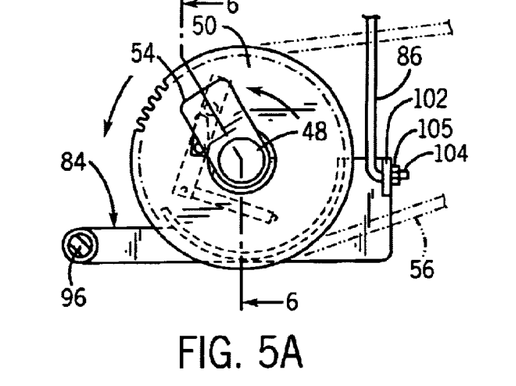
FIG. 5a is an enlarged partial side elevation view showing the drive member and the pickup input member of the overload and overfill protection system incorporated into the baler of FIG. 1, showing a trip member associated with the actuator mechanism in an inoperative position.
Figure 5B:
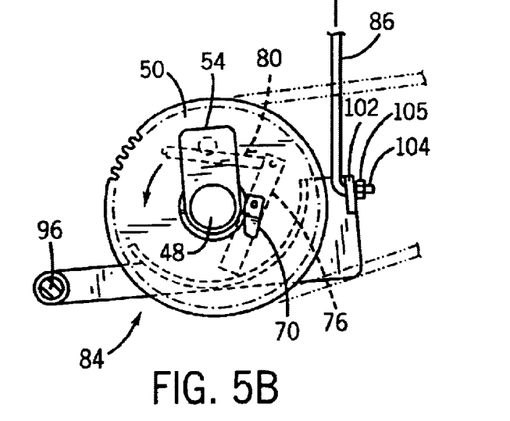
FIG. 5b is a view similar to FIG. 5a, showing the trip member in an operative position for cutting off the supply of power to the pickup drive system of the baler.

As shown in FIGS. 2, 5a and 5b, trip member 84 is pivotably mounted to the side sheet of baler 12 via a pivot shaft 96, which defines the axis of pivoting movement of trip member 84. Opposite pivot shaft 96, trip member 84 includes a curved cam member 98 defining an upwardly facing cam surface 100, best seen in FIGS. 7A and 7B. Trip member 84 is movable between a lowered, inoperative position as shown in FIG. 5a and a raised, operative position as shown in FIG. 5b, for selectively moving engagement member 70 to its disengaged position, in a manner to be explained.

Trip member 84 includes a tab 102 at its end opposite pivot shaft 96. Tab 102 includes an opening, and the lower end of vertical actuator rod 86 is formed with a laterally extending end section 104 which extends through the opening in tab 102. A nut 105 is engaged with threads on end section 104, for maintaining the lower end of vertical actuator rod 86 in engagement with trip member 84.

Figure 4A:
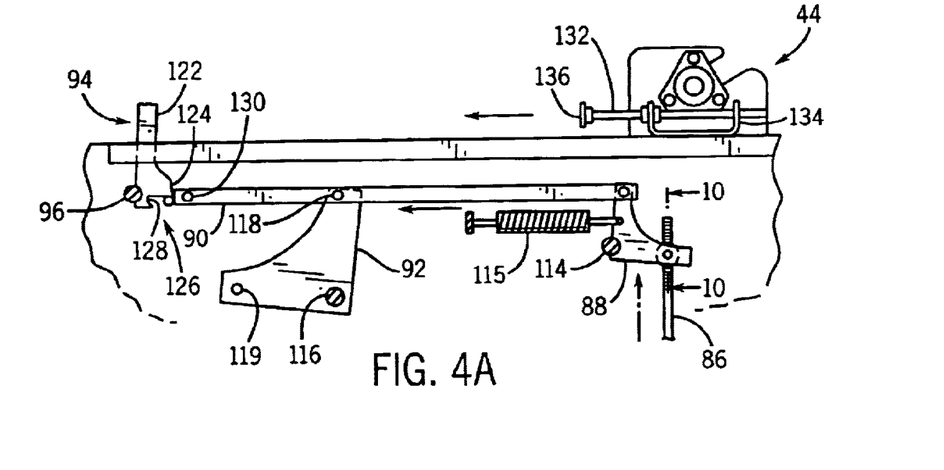
FIG. 4a is an enlarged partial side elevation view of a portion of the actuator system incorporated into the round baler of FIG. 1, corresponding to the position of the components illustrated in FIG. 2.
Figure 10:
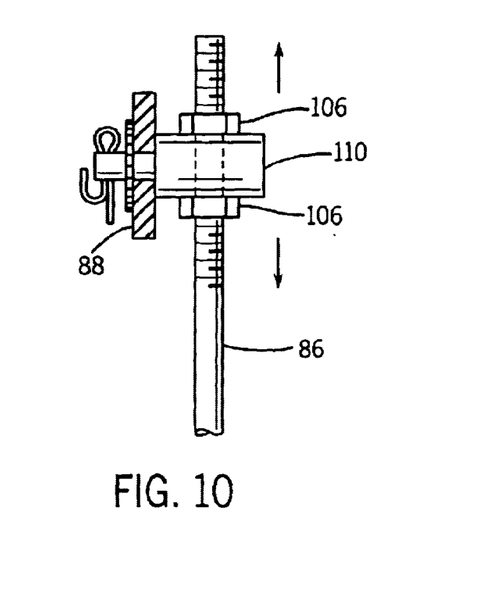

Referring to FIGS. 4a and 10, the upper end of vertical actuator rod 86 is engaged with a variable position mounting arrangement, in the form of a pair of threaded nuts 106 which engage threads formed at the upper end of vertical actuator rod 86. A knuckle member 110 is pivotably mounted to the lower leg of bell crank 88. With this construction, the lower end of vertical actuator rod 86 is pivotably mounted to the forward end of trip member 84, and the upper end of vertical actuator rod 86 is pivotably mounted to the lower leg of bell crank 88. Nuts 106 can be rotated so as to adjust the vertical position of vertical actuator rod 86.

Bell crank 88 is pivotably mounted to the side sheet of baler 12 via a pivot pin 112, and the forward end of horizontal actuator rod 90 is pivotably mounted to the upstanding leg of bell crank 88 via a pivot pin 114. A spring 115 is engaged between the side sheet of baler 12 and the upstanding leg of bell crank 88, and is operable to bias bell crank 88 in a counterclockwise direction. Reset crank 92 is pivotably mounted to the side sheet of baler 12 via a pivot pin 116, and horizontal actuator rod 90 is supported by reset crank 92 via a pivot pin 118. The lower leg of reset crank 92 has an outwardly extending reset pin 119 mounted toward its outer end.

Figure 4B:
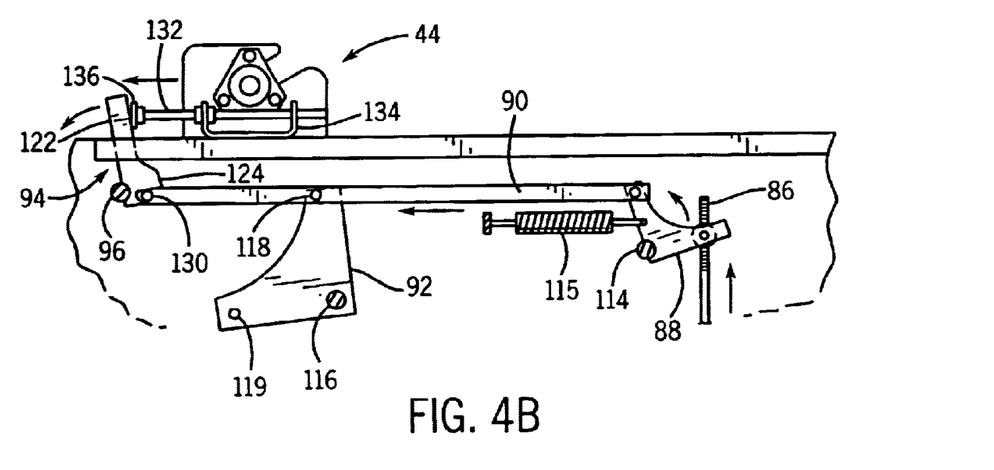
FIG. 4b is a view similar to FIG. 4a, showing the position of the components corresponding to FIG. 3.

Latch member 94 is carried by a pivot shaft 96 which is pivotably mounted to the side sheet of baler 12. Latch member 94 is movable between an upright latching position as shown in FIG. 4a, and a release position as shown in FIG. 4b. Latch member 94 defines an upstanding finger 122 and a forwardly extending lower retainer section 124. A notch 126 is formed at the lower end of latch member 94, and defines an end surface 128. When latch member 94 is in its latching position of FIG. 4a, the forward end of retainer section 124 engages the rearward end of horizontal actuator rod 90. When latch member 94 is in its release position of FIG. 4b, latch member 94 releases engagement between retainer section 124 and the rearward end of horizontal actuator rod 90. When latch member 94 is in its release position of FIG. 4b, spring 115 forces horizontal actuator rod 90 rearwardly such that a pin 130 mounted adjacent the rearward end of horizontal actuator rod engages end surface 128 of notch 126.

Finger 122 of latch member 94 is in horizontal alignment with a push rod 132 secured to shuttle assembly 44 via a push rod mounting bracket 134. Push rod 132 includes a push member 136 at its rearward end. In a preferred construction, push rod 132 may be threadedly engaged with mounting bracket 134 in order to provide adjustability in the position of push member 136.

In operation, actuator mechanism 82 and the selectively engageable drive arrangement provided by shear bolt 68 and engagement member 70 function as follows to provide combination overload and overfill protection for round baler 12.

During normal operation as bale B is being formed within bale-forming chamber 28, power is supplied to pickup mechanism 20 as described previously, by engagement of engagement surface 78 with the head of shear bolt 68, to transfer power from drive hub 54 to input driven sprocket 50. In this manner, rotary power is supplied to pickup mechanism 20 through chain 56, support shaft 58, outer sprocket 60, pickup drive chain 62 and pickup input sprocket 64. In the event pickup 20 experiences an overload condition, such as can occur if pickup 20 encounters a large tree limb or if pickup 20 is positioned such that the tines of pickup 20 are in constant contact with the ground, the excess load on pickup mechanism 20 is transferred to engagement member 70 and applied to the head of shear bolt 68. Shear bolt 68 is designed so that an overload force exceeding a predetermined threshold shears the shank of shear bolt 68 at its interface with the inner surface of drive hub 54. In this manner, shear bolt 68 functions to protect the remaining baler drive components from damage in the event of an overload force applied to pickup mechanism 20, and also immediately stops operation of pickup mechanism 20 to prevent damage to the remaining components of baler 12. When this occurs, the operator removes the remaining portion of shear bolt 68 and replaces shear bolt 68, to once again resume operation.

Figure 7A:
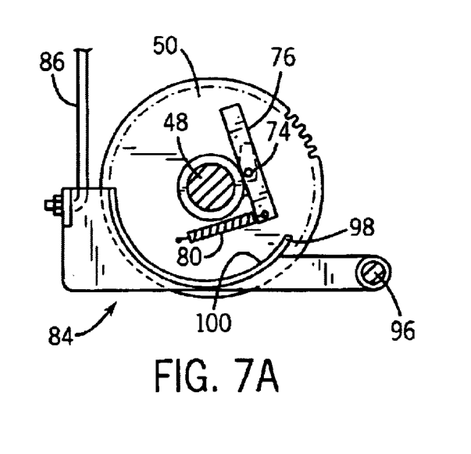
FIG. 7a is a partial section view taken along line 7a—7a of FIG. 6, showing the trip member-in its inoperative position.

The overfill prevention system of the present invention is provided by operation of actuator mechanism 82 and its interaction with engagement member 70. During normal formation of bale B within bale-forming chamber 28, actuator mechanism 82 is in its position of FIGS. 2 and 4a, in which trip member 84 is positioned in its inoperative position below lever 76, as shown in FIGS. 5a and 7a. In this position, trip member 84 does not engage lever 76, such that spring 80 is operable to maintain engagement member 70 in its engaged position as shown in solid lines in FIG. 8. Spring 115 maintains a counterclockwise bias on bell crank 88, which is resisted by engagement of the rearward end of horizontal actuator rod 90 with the forward end of retainer section 124 of latch member 94, as shown in FIGS. 2 and 4a.

Figure 7B:
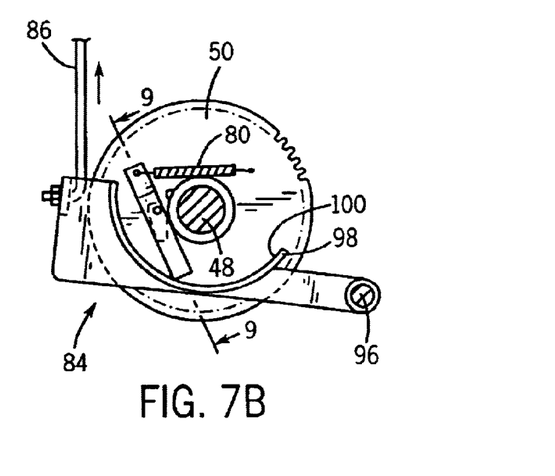
FIG. 7b is a view similar to FIG. 7a, showing the trip member in its operative position.

As bale B grows within bale-forming chamber 28, shuttle assembly 44 moves rearwardly in a known manner, to maintain tension on belts 14. When bale B attains a predetermined maximum bale diameter as shown in FIG. 3, shuttle assembly 44 attains a predetermined rearward position in which push member 136 of push rod 132 engages finger 122 of latch member 94, to pivot latch member 94 in a counterclockwise direction from its latching position to its release position. This functions to disengage the rearward end of horizontal actuator rod 90 from the forward end of latch member retainer section 124, as shown in FIGS. 3 and 4b, and spring 115 functions to move horizontal actuator rod 90 rearwardly so as to engage pin 130 of horizontal actuator rod 90 with notch end surface 128 of latch member 94. This movement of horizontal actuator rod 90 simultaneously causes counterclockwise rotation of reset crank 92 and bell crank 88. Such movement of reset crank 92 causes the reset pin 119 to move downwardly, and simultaneously causes the lower leg of bell crank 88 to apply an upward force to the upper end of vertical actuator rod 86. Such upward movement of vertical actuator rod 86 causes counterclockwise pivoting movement of trip member 84 to its operative position about the pivot axis defined by pivot shaft 96, to move cam surface 100 of cam member 98 into the path of lever 76, as shown in FIGS. 5b and 7b. When trip member 84 is moved to its operative position in this manner, the end of lever 76 engages cam surface 100 of cam member 98 so as to cause lever 76 to pivot about the pivot axis defined by pivot pin 74, which results in movement of engagement member 70 to is disengaged position as shown in phantom in FIG. 8. When engagement member 70 is in its disengaged position, engagement member 70 is moved inwardly out of engagement with the head of shear bolt 68, such that drive hub 54 continues to rotate in response to input rotary power supplied to baler 12. Without engagement of the head of shear bolt 68 with engagement member 70, however, power from drive hub 54 is not transferred to input driven sprocket 50, and power to pickup mechanism 20 is cut off. This prevents additional crop material from being supplied to bale-forming chamber 28, so that bale B cannot be formed to a diameter exceeding the capacity of baler 12.

Baler 12 is then operated to raise the tailgate of baler 12 in a conventional manner so as to discharge bale B from bale-forming chamber 28. During such operation of baler 12 to open the tailgate, the tailgate arm of baler 12 engages reset pin 119 of reset crank 92, which functions to pivot reset crank 92 in a clockwise direction, causing horizontal actuator rod 90 to move forwardly against the bias of spring 115. When bale B is ejected, shuttle assembly 44 moves forwardly in a conventional manner, and latch member 94 pivots by gravity in a clockwise direction to its latching position so as to once again engage the end surface of retainer section 124 of latch member 94 with the rear end of horizontal actuator rod 90, as shown in FIGS. 2 and 4a. Bell crank 88 pivots in a clockwise direction by the forward movement of horizontal actuator rod 90 against the force of spring 115, which causes vertical actuator rod 86 to move vertically downwardly so as to return trip member 84 to its disengaged position, in preparation for a subsequent baling operation. When trip member 84 is returned to its inoperative position in this manner, cam surface 100 of cam member 98 is moved out of engagement with lever 76. Spring 80 then acts on lever 76 so as to pivot engagement member 70 back to its engaged position, in which engagement surface 78 of engagement member 70 is in alignment with the head of shear bolt 68, so as to enable drive pickup mechanism 20 to be driven in response to rotation of drive hub 54.

It can thus be appreciated that the combination overload and overfill protection system of the present invention provides an efficient and effective drive system for selectively disabling the pickup of a round baler in the event of either an overload or an overfill condition. Common components are employed to accomplish both overload and overfill protection. Further, overload and overfill protection is accomplished in a chain drive system, which historically provides a difficult environment within which to accomplish a clutch-type feature. The components of the combination overload and overfill protection system can be adjusted as desired to accommodate manufacturing and operating tolerances, and to accommodate different maximum bale sizes.

Various alternatives and embodiments are contemplated as being within the scope of the following claims particularly pointing out and distinctly claiming the subject matter regarded as the invention.

We claim:

1. A round baler for forming round bales of agricultural crop material, wherein the round baler includes a powered rotary member, comprising:

a bale-forming chamber;

a pickup arrangement for supplying crop material from the ground to the bale-forming chamber;

a pickup drive system for supplying power to the pickup arrangement, wherein the pickup drive system includes a drive member which is selectively engageable with the powered rotary member of the baler;

a movable member associated with the baler which moves in response to growth of the bale within the bale-forming chamber, wherein the movable member is movable from an initial position to a full bale position when the bale has attained a predetermined maximum size within the bale-forming chamber; and wherein the pickup drive system is selectively engageable with the powered rotary member of the baler via an overfill protection mechanism interposed between the rotary member and the pickup drive system, wherein the overfill protection mechanism includes a selectively engageable drive arrangement which is operable to disengage the selectively engageable drive member of the pickup drive system in response to movement of the movable member to the full bale position to disable the pickup drive system and prevent the supply of additional crop material to the bale-forming chamber, wherein the selectively engageable drive arrangement includes a shearable member interconnected with one of the drive member and the powered rotary member, and a shiftable engagement member interconnected with the other of the drive member and the powered rotary member, wherein the shiftable engagement member is movable between an engaged position and a disengaged position, wherein the shiftable engagement member in its engaged position engages the shearable member for transferring power to the pickup drive system from the powered rotary member of the baler, and wherein the shiftable engagement member in its disengaged position is disengaged from the shearable member for preventing the transfer of power to the pickup drive system from the powered rotary member of the baler, and wherein the shiftable engagement member is movable from its engaged position to its disengaged position in response to movement of the movable member associated with the baler to its full bale position, and wherein the shiftable engagement member is operable to shear off the shearable member when the shiftable engagement member is in its engaged position in response to an overload force applied to the shiftable engagement member from the pickup arrangement, for preventing operation of the pickup arrangement and to prevent the supply of additional crop material to the bale-forming chamber.

2. The round baler of claim 1, wherein the pickup drive system includes a pickup drive input member located adjacent the rotary member, and wherein the shearable member and the shiftable member are interposed between the pickup drive input member and the rotary member.

3. The round baler of claim 2, wherein the rotary member comprises a rotatable hub member secured to a shaft which supports a roller associated with the baler, wherein rotation of the shaft and the roller causes rotation of the rotatable hub member.

4. The round baler of claim 2, wherein a flexible power transfer arrangement is interconnected between the pickup drive input member and the pickup arrangement for supplying power to the pickup arrangement.

5. The round baler of claim 4, wherein the pickup drive input member comprises a sprocket and wherein the flexible power transfer arrangement comprises a chain engaged with the sprocket and interconnected with the pickup arrangement.

6. The round baler of claim 4, wherein the shearable member is secured to one of the rotary member and the pickup drive input member, and wherein the shiftable engagement member is secured to the other of the pickup drive input member and the rotary member.

7. A round baler for forming round bales of agricultural crop material, wherein the round baler includes a powered rotary member, comprising:
a bale-forming chamber;
a pickup arrangement for supplying crop material from the ground to the bale-forming chamber;
a pickup drive system for supplying power to the pickup arrangement, wherein the pickup drive system includes a drive member which is selectively engageable with the powered rotary member of the baler;
a movable member associated with the baler which moves in response to growth of the bale within the bale-forming chamber, wherein the movable member is movable from an initial position to a full bale position when the bale has attained a predetermined maximum size within the bale-forming chamber;
wherein the pickup drive system is selectively engageable with the powered rotary member of the baler via an overfill protection mechanism interposed between the rotary member and the pickup drive system, wherein the overfill protection mechanism includes a selectively engageable drive arrangement which is operable to disengage the selectively engageable drive member of the pickup drive system in response to movement of the movable member to the full bale position to disable the pickup drive system and prevent the supply of additional crop material to the bale-forming chamber, wherein the selectively engageable drive arrangement includes a shiftable engagement member that is movable between an engaged position and a disengaged position, wherein the shiftable engagement member in its engaged position engages the drive member for transferring power to the pickup drive system from the powered rotary member of the baler, and wherein the shiftable engagement member in its disengaged position is disengaged from the drive member for preventing the transfer of power to the pickup drive system from the powered rotary member of the baler, and wherein the shiftable engagement member is movable from its engaged position to its disengaged position in response to movement of the movable member associated with the baler to its full bale position;

wherein the pickup drive system includes a pickup drive input member located adjacent the rotary member, and wherein the drive member and the shiftable member are interposed between the pickup drive input member and the rotary member, wherein a flexible power transfer arrangement is interconnected between the pickup drive input member and the pickup arrangement for supplying power to the pickup arrangement; and wherein the drive member is secured to one of the rotary member and the pickup drive input member, and wherein the shiftable engagement member is secured to the other of the pickup drive input member and the rotary member, wherein the drive member comprises a shearable member, wherein application of an overload force to the pickup arrangement results in application of a shearing force on the shearable member by the shiftable engagement member to shear the shearable member and to prevent the supply of power to the pickup drive input member.

8. A round baler for forming round bales of agricultural crop material, wherein the round baler includes a powered rotary member, comprising:
a bale-forming chamber;
a pickup arrangement for supplying crop material from the ground to the bale-forming chamber;
a pickup drive system for supplying power to the pickup arrangement, wherein the pickup drive system includes a drive member which is selectively engageable with the powered rotary member of the baler;
a movable member associated with the baler which moves in response to growth of the bale within the bale-forming chamber, wherein the movable member is movable from an initial position to a full bale position when the bale has attained a predetermined maximum size within the bale-forming chamber;
wherein the pickup drive system is selectively engageable with the powered rotary member of the baler via an overfill protection mechanism interposed between the rotary member and the pickup drive system, wherein the overfill protection mechanism includes a selectively engageable drive arrangement which is operable to disengage the selectively engageable drive member of the pickup drive system in response to movement of the movable member to the full bale position to disable the pickup drive system and prevent the supply of additional crop material to the bale-forming chamber, wherein the selectively engageable drive arrangement includes a shiftable engagement member that is movable between an engaged position and a disengaged position, wherein the shiftable engagement member in its engaged position engages the drive member for transferring power to the pickup drive system from the powered rotary member of the baler, and wherein the shiftable engagement member in its disengaged position is disengaged from the drive member for preventing the transfer of power to the pickup drive system from the powered rotary member of the baler, and wherein the shiftable engagement member is movable from its engaged position to its disengaged position in response to movement of the movable member associated with the baler to its full bale position;

wherein the pickup drive system includes a pickup drive input member located adjacent the rotary member, and wherein the drive member and the shiftable member are interposed between the pickup drive input member and the rotary member, wherein a flexible power transfer arrangement is interconnected between the pickup drive input member and the pickup arrangement for supplying power to the pickup arrangement;

wherein the drive member is secured to one of the rotary member and the pickup drive input member, and wherein the shiftable engagement member is secured to the other of the pickup drive input member and the rotary member; and wherein the overfill protection mechanism includes a movable trip member interconnected with an actuator mechanism with which the movable member of the baler is engageable when the movable member is in its full bale position, and a biased lever interconnected with the shiftable engagement member, wherein the actuator mechanism is operable to move the trip member to an operative position when the movable member of the baler is in its full bale position, wherein the trip member in its operative position engages the lever to move the shiftable engagement member to its disengaged position to prevent the transfer of power to the pickup drive input member and to thereby stop operation of the pickup arrangement, wherein the trip member is movable by means of the actuator mechanism to an inoperative position in which the trip member allows the biased lever to return the shiftable engagement member to its engaged position when the movable member of the baler is moved away from its full bale position.

9. An overload and overfill protection system for a round baler having a bale-forming chamber and a pickup arrangement for supplying crop material from the ground to the bale-forming chamber, wherein the pickup arrangement includes a rotatable power input member and wherein the baler includes a rotatable drive member, comprising:

a shearable member secured to one of the rotatable power input member and the rotatable drive member;

a shiftable engagement member secured to the other of the rotatable power input member and the rotatable drive member, wherein the shiftable engagement member is movable between an engaged position in which the engagement member engages the shearable member to impart rotation to the rotatable power input member in response to rotation of the rotatable drive member, and a disengaged position in which the engagement member is moved out of engagement with the shearable member to prevent rotation of the rotatable power input member; and an actuator mechanism interconnected with the shiftable engagement member, wherein the actuator mechanism is operable to move the shiftable engagement member from its engaged position to its disengaged position in response to the bale attaining a predetermined maximum size within the bale-forming chamber, for preventing operation of the pickup arrangement to prevent the supply of additional crop material to the bale-forming chamber;

wherein the shiftable engagement member is operable to shear off the shearable member when the shiftable engagement member is in its engaged position in response to an overload force applied to the engagement member from the pickup arrangement, for preventing operation of the pickup arrangement and to prevent the supply of additional crop material to the bale-forming chamber.

10. The overload and overfill protection system of claim 9, wherein the shiftable engagement member is biased toward its engaged position.

11. The overload and overfill protection system of claim 10, wherein the shiftable engagement member is interconnected with a lever, and wherein the actuator mechanism includes a movable actuator member which is movable between an operative position and an inoperative position, wherein the actuator member in its operative position engages the lever to move the shiftable engagement member to its disengaged position against the bias of the shiftable engagement member, and wherein the actuator member in its inoperative position does not engage the lever so as to enable the bias of the shiftable engagement member to place the shiftable engagement member in its engaged position.

12. The overload and overfill protection system of claim 11, wherein the shiftable engagement member and the lever are mounted to the rotatable power input member of the pickup arrangement, and wherein the shiftable engagement member is biased toward its engaged position by means of a spring interposed between the lever and the rotatable power input member for biasing the shiftable engagement member toward its engaged position.

13. The overload and overfill protection system of claim 12, wherein the rotatable power input member of the pickup arrangement comprises a sprocket which rotates on a shaft associated with the round baler, and wherein the rotatable drive member comprises a hub member secured to the shaft.

14. The overload and overfill protection system of claim 9, wherein the baler includes a movable member which is movable from an initial position to a full bale position when the bale has attained a predetermined maximum size within the bale-forming chamber, and wherein the actuator mechanism is movable from an inoperative position to an operative position in response to movement of the movable member to its full bale position, wherein the actuator mechanism in its operative position functions to move the shiftable engagement member from its engaged position to its disengaged position.

15. The overload and overfill protection system of claim 14, wherein the actuator mechanism is biased toward its operative position and includes an actuating member which normally maintains the actuator mechanism in its inoperative position against the bias of the actuator mechanism toward its operative position, and wherein the movable member of the baler engages the actuating member when the movable member is in its full bale position, wherein the actuating member is moved and is configured so as to enable the actuator mechanism to move to its operative position.

16. The overload and overfill protection system of claim 15, wherein the baler includes a tailgate which is movable between a closed position in which the bale is formed within the bale-forming chamber, and an open position in which the bale is ejected from the bale-forming chamber, and wherein the actuator mechanism includes a reset member which positions the actuator mechanism in its inoperative position against the bias of the actuator mechanism toward its operative position, in response to movement of the tailgate from its open position to its closed position.

17. A clutch arrangement for a pickup mechanism associated with a round baler having a rotatable drive member, wherein the round baler includes a bale-forming chamber for receiving crop material from the pickup mechanism and for forming the crop material into a round bale, comprising:
   a pickup drive member located adjacent the rotatable drive member;
   a power transfer member engaged between the pickup mechanism and the pickup drive member for transferring power from the pickup drive member to the pickup mechanism;
   a selective engagement arrangement interposed between the rotatable drive member of the round baler and the pickup drive member, wherein the selective engagement arrangement includes a shearable member secured to one of the rotatable drive member and the pickup drive member, and a shiftable engagement member secured to the other of the rotatable drive member and the pickup drive member, wherein the shiftable engagement member is normally in engagement with the shearable member to rotate the power transfer member in response to rotation of the rotatable drive member of the baler, and wherein the selective engagement arrangement is movable to a disengaged position in which the shiftable member is moved out of engagement with the shearable member so that power from the rotatable drive member is not transferred to the pickup drive member to prevent the transfer of power to the pickup mechanism; and
   an actuator interconnected with the selective engagement arrangement for moving the selective engagement arrangement to the disengaged position in response to the bale attaining a predetermined maximum size within the bale-forming chamber of the baler, for preventing the transfer of power to the pickup mechanism and thereby preventing the supply of additional crop material to the bale-forming chamber;
   wherein the shiftable engagement member is operable to shear off the shearable member when the shiftable engagement member is in engagement with the shearable member in response to an overload force applied to the shiftable engagement member from the pickup mechanism, for preventing operation of the pickup mechanism and to prevent the supply of additional crop material to the bale-forming chamber.

18. The clutch arrangement of claims 17, wherein the pickup drive member comprises a pickup drive sprocket and wherein the power transfer member comprises a pickup drive chain engaged with the pickup drive sprocket.

19. The clutch arrangement of claim 18, wherein the pickup drive sprocket is rotatably mounted to a shaft associated with the round baler, and wherein the rotatable drive member of the round baler comprises a drive hub secured to the shaft.

20. A clutch arrangement for a pickup mechanism associated with a round baler having a rotatable drive member, wherein the round baler includes a bale-forming chamber for receiving crop material from the pickup mechanism and for forming the crop material into a round bale, comprising:
   a pickup drive member located adjacent the rotatable drive member;
   a power transfer member engaged between the pickup mechanism and the pickup drive member for transferring power from the pickup drive member to the pickup mechanism;
   a selective engagement arrangement interposed between the rotatable drive member of the round baler and the pickup drive member, wherein the selective engagement arrangement is normally in an engaged position to rotate the power transfer member in response to rotation of the rotatable drive member of the baler, and wherein the selective engagement arrangement is movable to a disengaged position in which power from the rotatable drive member is not transferred to the pickup drive member to prevent the transfer of power to the pickup mechanism; and
   an actuator interconnected with the selective engagement arrangement for moving the selective engagement arrangement to the disengaged position in response to the bale attaining a predetermined maximum size within the bale-forming chamber of the baler, for preventing the transfer of power to the pickup mechanism and thereby preventing the supply of additional crop material to the bale-forming chamber;
   wherein the pickup drive member comprises a pickup drive sprocket and wherein the power transfer member comprises a pickup drive chain engaged with the pickup drive sprocket;
   wherein the selective engagement arrangement comprises a fixed drive member secured to one of the pickup drive sprocket and the rotatable drive member, and a movable engagement member secured to the other of the pickup drive sprocket and the rotatable drive member, and wherein the actuator comprises a movable actuator mechanism which is movable from an inoperative position to an operative position when the bale attains the predetermined maximum size within the bale-forming chamber, wherein the movable actuator mechanism in its operative position functions to move the movable engagement member to the disengaged position to disengage the movable engagement member from the fixed drive member and to prevent the transfer of power from the rotatable drive member to the pickup drive member.

21. The clutch arrangement of claim 20, wherein the movable engagement member is interconnected with a biased lever which biases the movable engagement member toward its engaged position, and wherein the movable actuator mechanism includes a trip member which engages the lever when the movable actuator mechanism is in its operative position, and is configured to engage the lever to move the movable engagement member to its disengaged position against the bias of the lever which biases the movable engagement member toward its engaged position.

22. A method of operating a pickup mechanism of a round baler having a bale-forming chamber, wherein the pickup mechanism includes a rotatable power input member and wherein the round baler includes a rotating drive member, comprising the steps of:

interposing a selectively engageable shearable power transfer mechanism between the rotating drive member of the baler and the power input of the pickup mechanism, wherein the power transfer mechanism includes a fixed shearable drive member and a movable engagement member;

normally engaging the fixed shearable drive member and the movable engagement member of the power transfer mechanism to operate the pickup mechanism to supply crop material to the bale-forming chamber;

disengaging the power transfer mechanism by moving the movable engagement member out of engagement with the fixed shearable drive member when the bale attains a predetermined maximum size within the bale-forming chamber to stop operation of the pickup mechanism and cut off the supply of crop material to the bale-forming chamber;

wherein the movable engagement member of the power transfer mechanism is operable to shear the fixed shearable drive member in response to an overload force applied to the pickup mechanism, to disable the power transfer mechanism and to prevent the supply of additional crop material to the bale-forming chamber.

23. The method of claim 22, wherein the step of disengaging the power transfer mechanism is carried out by operation of an actuator mechanism which is movable from an inoperative position to an operative position when the bale attains the predetermined maximum size within the bale-forming chamber.

24. The method of claim 23, wherein the step of normally engaging the stationary shearable drive member and the movable engagement member is carried out by biasing the movable engagement member toward an engaged position in which the movable engagement member is engaged with the fixed shearable drive member, and wherein the actuator mechanism in its operative position functions to move the movable engagement member to a disengaged position out of engagement with the fixed shearable drive member against the bias of the movable engagement member toward its engaged position.

25. The method of claim 23, wherein the step of moving the actuator mechanism from its inoperative position to its operative position is carried out in response to movement of a movable member associated with the baler, wherein the movable member moves from an initial position to a full bale position when the bale has attained the maximum predetermined size within the bale-forming chamber.

26. The method of claim 25, further comprising the step of biasing the actuator mechanism toward its operative position and maintaining the actuator mechanism in its inoperative position by means of an actuating member, wherein the movable member of the baler engages the actuating member when the bale attains the maximum predetermined size within the bale-forming chamber, wherein engagement of the actuating member by the movable member allows the actuator mechanism to move to its operative position under the bias of the actuator mechanism toward the operative position, and further comprising the step of resetting the actuator mechanism to its inoperative position after the bale has been ejected from the bale-forming chamber by movement of a tailgate mechanism associated with the baler from an open position, in which the bale is ejected from the bale-forming chamber, to a closed position.

* * * * *